US012613195B2

(12) United States Patent
Hirano et al.

(10) Patent No.: US 12,613,195 B2
(45) Date of Patent: Apr. 28, 2026

(54) ADJUSTMENT METHOD OF INSPECTION APPARATUS FOCUS POSITION, AND PATTERN INSPECTION APPARATUS

(71) Applicant: NuFlare Technology, Inc., Yokohama (JP)

(72) Inventors: Ryoichi Hirano, Setagaya-ku (JP); Yasuhiro Yamashita, Yokohama (JP); Toshiaki Otaki, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 283 days.

(21) Appl. No.: 18/436,083

(22) Filed: Feb. 8, 2024

(65) Prior Publication Data

US 2024/0280500 A1      Aug. 22, 2024

(30) Foreign Application Priority Data

Feb. 22, 2023      (JP) ................................. 2023-025742

(51) Int. Cl.
*G01N 21/956* (2006.01)
*G01N 21/88* (2006.01)
*G01N 21/95* (2006.01)

(52) U.S. Cl.
CPC ..... *G01N 21/8806* (2013.01); *G01N 21/8851* (2013.01); *G01N 21/95607* (2013.01); *G01N 21/9501* (2013.01); *G01N 2201/103* (2013.01)

(58) Field of Classification Search
CPC ........... G01N 21/8806; G01N 21/8851; G01N 21/95607; G01N 21/9501; G01N 2201/103
See application file for complete search history.

(56) References Cited

U.S. PATENT DOCUMENTS

2003/0121022 A1 *   6/2003  Yoshitake ........... G03F 7/70558
438/8

FOREIGN PATENT DOCUMENTS

JP        2020-125941 A      8/2020
JP        2021128119 A   *  9/2021
WO     WO-2023177415 A1 *  9/2023   ........... G06V 40/161

* cited by examiner

*Primary Examiner* — Michelle M Iacoletti
*Assistant Examiner* — Jarreas Underwood
(74) *Attorney, Agent, or Firm* — Oblon, McClelland, Maier & Neustadt, L.L.P.

(57) ABSTRACT

A method for adjusting a focus position of an inspection apparatus includes measuring, while varying a height position of a pattern forming surface of an evaluation substrate with thereon plural types of figure patterns, for each type of figure pattern, light amounts at front and back focus positions of a light transmitted through or reflected from the evaluation substrate irradiated with an inspection light, calculating an autofocus signal, for each type of figure pattern and for each height position of the pattern forming surface, by using the light amounts measured at the front and back focus positions, and specifying a value of an inspection autofocus signal such that a difference between autofocus signal values of plural type figure patterns calculated at the same height position of the pattern forming surface is equal to or less than a threshold value.

10 Claims, 12 Drawing Sheets

SCAN WIDTH W

BEFORE ADJUSTMENT          AFTER ADJUSTMENT

ADJUSTMENT METHOD OF INSPECTION APPARATUS FOCUS POSITION, AND PATTERN INSPECTION APPARATUS

CROSS-REFERENCE TO RELATED APPLICATION

This application is based upon and claims the benefit of priority from prior Japanese Patent Application No. 2023-025742 filed on Feb. 22, 2023 in Japan, the entire contents of which are incorporated herein by reference.

BACKGROUND OF THE INVENTION

Field of the Invention

Embodiments of the present invention relate to an adjustment method of an inspection apparatus focus position, and to a pattern inspection apparatus. For example, they relate to an apparatus that inspects pattern defects on an exposure mask used in semiconductor manufacturing, and to a method for adjusting a focus position of the apparatus.

Description of Related Art

With recent progress in high integration and large capacity of the LSI (Large Scale Integrated circuits), the line width (critical dimension) required for circuits of semiconductor elements is becoming increasingly narrower. Such semiconductor elements are manufactured through circuit forming processing by exposing and transferring a pattern onto a wafer by means of a reduced projection exposure apparatus known as a stepper, using an original or "master" pattern (also called a mask or a reticle, hereinafter generically referred to as a mask) on which a circuit pattern has been formed.

Since LSI manufacturing requires an enormous production cost, it is essential to improve the yield. One of major factors that decrease the yield is due to pattern defects on a mask for exposing/transferring an ultrafine pattern onto a semiconductor wafer by the photolithography technology. In recent years, with miniaturization of dimensions of LSI patterns formed on a semiconductor wafer, dimensions to be detected as a pattern defect have become extremely small. Therefore, a pattern inspection apparatus for inspecting defects of a transfer mask used in manufacturing LSI needs to be highly accurate.

As an inspection method, for example, there is "die-to-die inspection" or "die-to-database inspection". The "die-to-die inspection" method compares data of optical images of identical patterns at different positions on the same mask. The "die-to-database inspection" method inputs, into an inspection apparatus, writing data (design data) generated by converting pattern-designed CAD data to a writing-apparatus-specific format to be input to the writing apparatus when a pattern is written on the mask, generates a reference image based on the input writing data, and compares the generated reference image with an optical image being measured target data obtained by imaging the pattern.

In such an inspection apparatus, what is needed is to clearly obtain pattern images on the mask to be inspected. However, since a finite focal depth exists in the optical system of the inspection apparatus, the inspection surface of an inspection target needs to be continuously maintained within the focal depth of the optical system during the inspection. In other words, the contrast of an acquired image needs to be maintained within an allowable range. Since continuous imaging by scanning the mask while moving the stage is required in the inspection apparatus, it is not realistic to adjust a focus of the optical system by calculating the image contrast one by one during the inspection because it causes a shortage of the processing time.

Then, the inspection apparatus employs, in addition to the inspection optical system for acquiring images, an autofocus mechanism that detects a height-wise displacement of an inspection target object against the inspection optical system in order to adjust the height position.

Currently, a high numerical aperture (NA) of objective lenses is increasing with recent miniaturization of patterns. Along with this, the focal depth of the inspection optical system has become shallow (short). Accordingly, although conventionally the accuracy of the measuring system of the autofocus mechanism installed independently close to the inspection optical system has been sufficient, it recently becomes difficult to perform a highly accurate focus adjustment because various change factors (dependency on temperature/mechanical transformation) of the inspection optical system cannot be detected if not conducting (in-situ) measurement which uses the inspection optical system itself. Thus, there is employed a configuration in which the inspection optical system is partially utilized as an autofocus mechanism (e.g., refer to Japanese Patent Application Laid-open (JP-A) No. 2020-125941).

The autofocus mechanism, when the apparatus is started up, measures a linear signal change of an autofocus signal by moving up and down the height position of the mask which has a uniform reflection surface regarding the focus position of the autofocus optical system as a reference. However, there is an error between the focus position of the autofocus optical system and that of the inspection optical system. Therefore, an offset is added to the focus position of the autofocus optical system in order to adjust the height of the mask so that the focus position of the inspection optical system may be maintained.

Due to that miniaturizing a pattern and shortening an inspection light wavelength have progressed, it has turned out that the gradient of an autofocus signal changes depending on the type of pattern on the mask. Accordingly, the output of an autofocus signal at the time of the height position of the mask being displaced by a certain displacement amount from the focus position of the autofocus optical system varies depending upon the type of pattern. Thus, the height position of the mask to be adjusted changes depending on the type of pattern on the mask.

By contrast, at the side of the sensor for imaging patterns, conventionally, when the apparatus is started up, a test mask with written test patterns of various sizes and shapes is set at a focus position of the inspection optical system, and then, the sensor circuit is adjusted so that the same measurement value can be output with respect to any image-acquired pattern. Therefore, if the height position of the mask changes depending on the type of pattern formed on the mask, a problem occurs that highly precise images cannot be acquired because the accuracy of values of image signals output from the sensor degrades. Then, along with the miniaturization of patterns and the increase in the high numerical aperture (NA) of objective lenses, it has become difficult to ignore an influence of image blurring generated with degradation of values of image signals since it results in generating a pseudo defect.

BRIEF SUMMARY OF THE INVENTION

According to one aspect of the present invention, a method for adjusting a focus position of an inspection apparatus includes measuring, while varying a height position of a pattern forming surface of an evaluation substrate on which a plurality of types of figure patterns are formed, for each of the plurality of types of figure patterns, a light amount at a front focus position and a light amount at a back focus position of one of a light transmitted through the evaluation substrate and a light reflected from the evaluation substrate irradiated with an inspection light;

calculating an autofocus signal, for the each of the plurality of types of figure patterns and for each the height position of the pattern forming surface of the evaluation substrate, by using the light amount measured at the front focus position and the light amount measured at the back focus position;

specifying a value of an autofocus signal for inspection such that a difference between values of autofocus signals of the plurality of types of figure patterns calculated at a same height position of the pattern forming surface of the evaluation substrate is one of equal to and less than a threshold value; and acquiring, in a state where an inspection substrate on which at least two types of figure patterns out of the plurality of types of figure patterns are formed is placed on a stage, while adjusting a height position of a pattern forming surface of the inspection substrate, which may be changed with a horizontal direction movement of the stage, to a height position of the pattern forming surface corresponding to the value of the autofocus signal for inspection, an optical image of the inspection substrate by receiving by a sensor, through an inspection optical system, one of a light transmitted through the inspection substrate and a light reflected from the inspection substrate irradiated with an inspection light.

According to another aspect of the present invention, a pattern inspection apparatus includes a stage configured to mount thereon an evaluation substrate on which a plurality of types of figure patterns have been formed;

a drive mechanism configured to move a height position of the stage;

an autofocus optical system configured to lead, while varying a height position of a pattern forming surface of the evaluation substrate by moving the height position of the stage, one of a light transmitted through the evaluation substrate and a light reflected from the evaluation substrate irradiated with an inspection light to a first light amount sensor and a second light amount sensor which measure, for each of the plurality of types of figure patterns, a light amount at a front focus position and a light amount at a back focus position of the one of the light transmitted through the evaluation substrate and the light reflected from the evaluation substrate;

an autofocus signal calculation circuit configured to calculate an autofocus signal, for the each of the plurality of types of figure patterns and for each the height position of the pattern forming surface of the evaluation substrate, by using the light amount measured at the front focus position and the light amount measured at the back focus position;

a specification circuit configured to specify a value of an autofocus signal for inspection such that a difference between values of autofocus signals of the plurality of types of figure patterns calculated at a same height position of the pattern forming surface of the evaluation substrate is one of equal to and less than a threshold value;

an autofocus mechanism configured to adjust, in a state where an inspection substrate on which at least two types of figure patterns out of the plurality of types of figure patterns are formed is placed on the stage, a height position of a pattern forming surface of the inspection substrate, which may be changed with a horizontal direction movement of the stage, to a height position of the pattern forming surface corresponding to the value of the autofocus signal for inspection;

a sensor configured to acquire, in a state where the height position of the pattern forming surface of the inspection substrate has been adjusted to the height position of the pattern forming surface corresponding to the value of the autofocus signal for inspection, an optical image of the inspection substrate by receiving one of a light transmitted through the inspection substrate and a light reflected from the inspection substrate irradiated with an inspection light; and an inspection optical system configured to lead the one of the light transmitted through the inspection substrate and the light reflected from the inspection substrate to the sensor.

According to yet another aspect of the present invention, a method for adjusting a focus position of an inspection apparatus includes measuring, while varying a height position of a pattern forming surface of a substrate on which a plurality of types of figure patterns are formed, for each of the plurality of types of figure patterns, a light amount at a front focus position and a light amount at a back focus position of one of a light transmitted through the substrate and a light reflected from the substrate irradiated with an inspection light;

calculating an autofocus signal, for the each of the plurality of types of figure patterns and for each the height position of the pattern forming surface of the substrate, by using the light amount measured at the front focus position and the light amount measured at the back focus position;

specifying a value of an autofocus signal for inspection such that a difference between values of autofocus signals of the plurality of types of figure patterns calculated at a same height position of the pattern forming surface of the evaluation substrate is one of equal to and less than a threshold value; and acquiring, in a state where the substrate is placed on a stage, while adjusting the height position of the pattern forming surface of the substrate, which may be changed with a horizontal direction movement of the stage, to a height position of the pattern forming surface corresponding to the value of the autofocus signal for inspection, an optical image of the substrate by receiving by a sensor, through an inspection optical system, the one of the light transmitted through the substrate and the light reflected from the substrate irradiated with an inspection light.

DETAILED DESCRIPTION OF THE INVENTION

The embodiments below describe an inspection apparatus that can prevent or reduce errors of a height position of a substrate pattern forming surface adjusted at the time of autofocusing which occur depending on the type of pattern formed on the substrate such as a mask, and describe a method for adjusting a focus position.

First Embodiment

Figure 1:
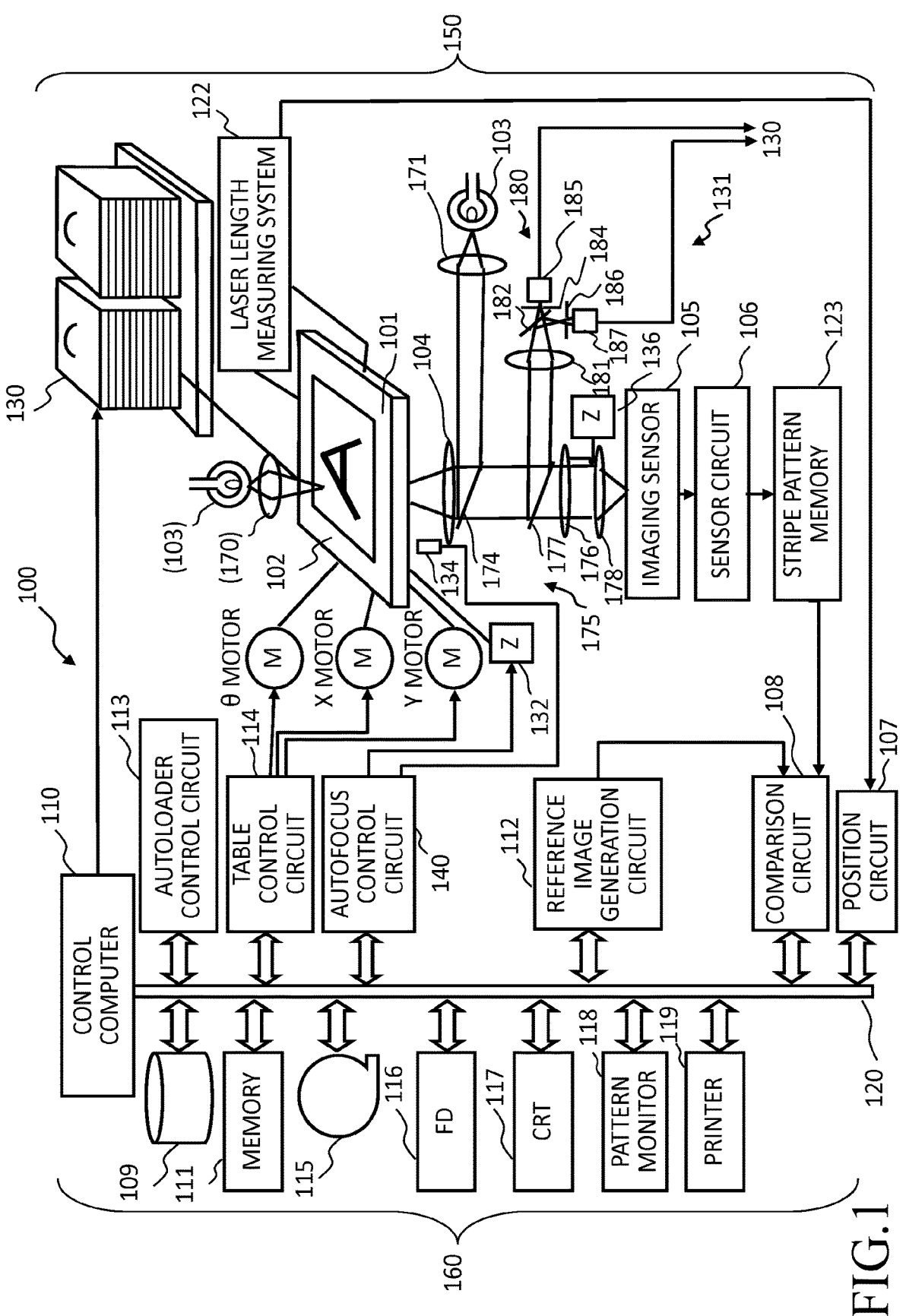
FIG. 1 is a configuration diagram showing a pattern inspection apparatus according to a first embodiment.

FIG. 1 is a configuration diagram showing a pattern inspection apparatus according to a first embodiment. As shown in FIG. 1, an inspection apparatus 100 that inspects defects of a pattern formed on an inspection target substrate, such as a mask, includes an optical image acquisition mechanism 150 and a control system circuit 160.

The optical image acquisition mechanism 150 includes a light source 103, a reflection illumination optical system 171, an XYθ table 102 movably arranged, a magnifying optical system 104, a beam splitter 174, a beam splitter 177, a collimating lens 176, an image forming optical system 178, an autofocus mechanism 131, an imaging sensor 105, a sensor circuit 106, a stripe pattern memory 123, a laser length measuring system 122, and an autoloader 130. In the case of conducting a transmission inspection using a transmitted light, a transmission illumination optical system 170 is further arranged. In the case of conducting only a reflection inspection using a reflected light without performing a transmission inspection, the transmission illumination optical system 170 may be omitted. In the case of simultaneously conducting a transmission inspection and a reflection inspection, an imaging sensor (not illustrated) is further added to acquire an image for the reflection inspection by the imaging sensor 105 and an image for the transmission inspection by the added imaging sensor.

The autofocus mechanism 131 includes an autofocus optical system 180, a light amount sensor 185 (first light amount sensor), a light amount sensor 187 (second light amount sensor), a Z drive mechanism 132, and a position sensor 134.

The autofocus optical system 180 includes an image forming optical system 181, a beam splitter 182, slit plates 184, and 186. The autofocus optical system 180 leads a light having transmitted through or reflected from the substrate to the light amount sensors 185 and 187. The beam splitter 182 is placed on the front side of the focus position. The slit plate 184 is arranged at the front focus position, and receives a light transmitted through the beam splitter 182. The light amount sensor 185 measures a light amount having passed through the slit plate 184 placed at the front focus position. The slit plate 186 is arranged at the back focus position (or "rear focus position"), and receives a light branched by the beam splitter 182. The light amount sensor 187 measures a light amount having passed through the slit plate 186 placed at the back focus position.

On the XYθ table 102, there is placed a substrate 101 conveyed from the autoloader 130. The substrate 101 is, for example, an exposure photomask used for transfer printing a pattern onto a semiconductor substrate such as a wafer. A plurality of types of figure patterns to be inspected are formed on the photomask. The substrate 101 is disposed, for example, with its pattern forming surface facing downward, on the XYθ table 102. The XYθ table 102 is an example of the stage.

As the imaging sensor 105, a line sensor or a two-dimensional sensor is used. For example, it is preferable to use a TDI (time delay integration) sensor. The TDI sensor includes a plurality of photo sensor elements arranged two-dimensionally. When acquiring an image by each photo sensor element, a predetermined image accumulation time is set. In the TDI sensor, outputs of a plurality of photo sensor elements arrayed in a scanning direction are integrated to be output. The plurality of photo sensor elements arrayed in a scanning direction acquire images of the same pixel while shifting the time according to the movement of the XYθ table 102. In the case of using a line sensor, a plurality of photo sensor elements are arranged in the direction perpendicular to the scanning direction.

In the control system circuit 160, a control computer 110 which controls the whole of the inspection apparatus 100 is connected, through a bus 120, to a position circuit 107, a comparison circuit 108, a reference image generation circuit 112, an autoloader control circuit 113, a table control circuit 114, an autofocus control circuit 140, a magnetic disk drive 109, a memory 111, a magnetic tape drive 115, a flexible disk drive (FD) 116, a CRT 117, a pattern monitor 118, and a printer 119. The imaging sensor 105 is connected to the stripe pattern memory 123 which is connected to the comparison circuit 108. The reference image generation circuit 112 is also connected to the comparison circuit 108.

Outputs of the position sensor 134 are connected to the autofocus control circuit 140. Outputs of the light amount sensors 185 and 187 are also connected to the autofocus control circuit 140.

Each " . . . circuit", such as the position circuit 107, the comparison circuit 108, the reference image generation circuit 112, the autoloader control circuit 113, the table control circuit 114, and the autofocus control circuit 140 includes processing circuitry. The processing circuitry includes, for example, an electric circuit, computer, processor, circuit board, quantum circuit, semiconductor device, or the like. Common processing circuitry (the same processing circuitry), or different processing circuitry (separate processing circuitry) may be used for each "circuit". For example, each " . . . circuit", such as the position circuit 107, the comparison circuit 108, the reference image generation circuit 112, the autoloader control circuit 113, the table control circuit 114, and the autofocus control circuit 140 may be configured and executed by the control computer 110. Input data necessary for the position circuit 107, the comparison circuit 108, the reference image generation circuit 112, the autoloader control circuit 113, the table control circuit 114, and the autofocus control circuit 140, and operated (calculated) results are stored in a memory (not shown) in each circuit or the memory 111 each time. Input data necessary for the control computer 110 and operated (calculated) results are stored in a memory (not shown) in the control computer 110, or the memory 111 each time. A program for causing a computer or a processor to execute processing and the like may be stored in a recording medium, such as the magnetic disk drive 109, the magnetic tape drive 115, the FD 116, the ROM (Read Only Memory), or the like.

In the inspection apparatus 100, a reflection inspection optical system and/or a transmission inspection optical system are installed as an inspection optical system 175. A reflection inspection optical system of high magnification is configured by the light source 103, the reflection illumination optical system 171, the beam splitter 174, the magnifying optical system 104, the XYθ table 102, the collimating lens 176, and the image forming optical system 178. The transmission inspection optical system of high magnification is configured by the light source 103, the transmission illumination optical system 170, the XYθ table 102, the magnifying optical system 104, the collimating lens 176, and the image forming optical system 178.

The XYθ table 102 is driven by the table control circuit 114 under the control of the control computer 110. The XYθ table 102 can be moved by a drive system such as a three-axis (X, Y, and θ) motor which drives the table in the directions of X, Y, and θ. For example, a step motor can be used as each of these X, Y, and θ motors. The XYθ table 102 is movable in the horizontal direction and the rotation direction by the X-, Y-, and θ-axis motors. The XYθ table 102 is an example of the stage. The movement position of the substrate 101 placed on the XYθ table 102 is measured by the laser length measuring system 122, and supplied to the position circuit 107. The transfer processing of the substrate 101 from the autoloader 130 to the XYθ table 102, and from the XYθ table 102 to the autoloader 130 is controlled by the autoloader control circuit 113.

The XYθ table 102 is driven in the Z direction by the Z drive mechanism 132 controlled by the autofocus control circuit 140. As the Z drive mechanism 132, it is preferable to use a piezoelectric element or a step motor, for example. The height position of the XYθ table 102 is measured by the position sensor 134, and the measurement result is output to the autofocus control circuit 140.

The collimating lens 176 is driven in the Z direction by a Z drive mechanism 136 controlled by the autofocus control circuit 140. As the Z drive mechanism 136, it is preferable to use a piezoelectric element or a step motor, for example.

Writing data (design data) used as a basis for forming patterns on the inspection substrate 101 which is to be inspected is input from the outside of the inspection apparatus 100, and stored in the magnetic disk drive 109. The writing data defines a plurality of types of figure patterns, and each figure pattern is usually configured by combining a plurality of element figures. It is acceptable to configure a figure pattern by one figure. Then, each pattern corresponding to and based on each figure pattern defined by the writing data is formed on the inspection substrate 101.

FIG. 1 shows configuration elements necessary for describing the first embodiment. Needless to say, other configuration elements generally necessary for the inspection apparatus 100 may also be included therein.

Figure 2:
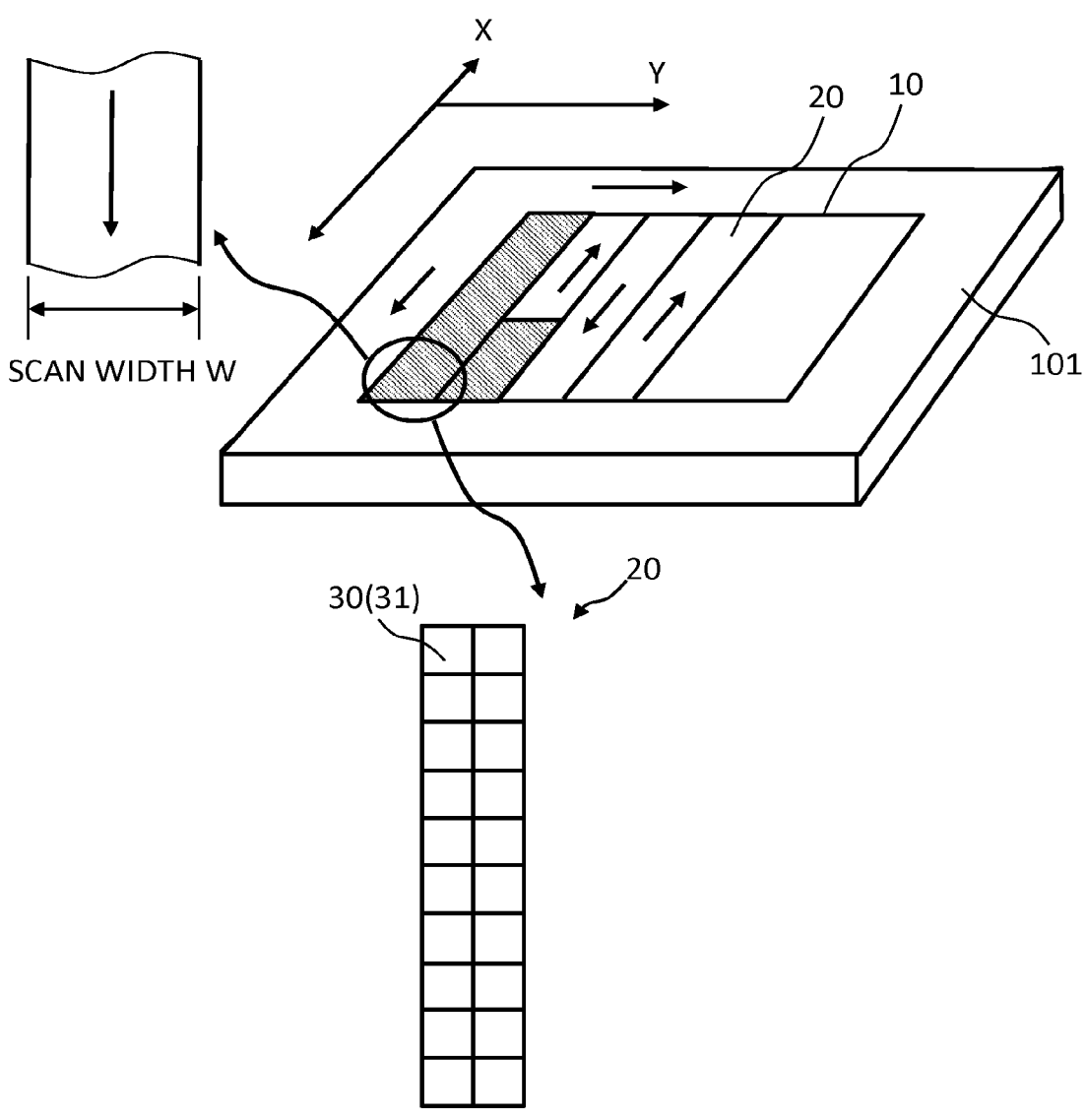
FIG. 2 is a conceptual diagram illustrating an inspection region according to the first embodiment.

FIG. 2 is a conceptual diagram illustrating an inspection region according to the first embodiment. As shown in FIG. 2, an inspection region 10 (the entire inspection region) of the substrate 101 is virtually divided into a plurality of strip-shaped inspection stripes 20 each having a width W in the y direction, for example, where the width W is a scan width of the imaging sensor 105. The inspection apparatus 100 acquires an image (stripe region image) for each inspection stripe 20. Specifically, with respect to each of the inspection stripes 20, the inspection apparatus 100 acquires (captures) an image of a figure pattern arranged in the stripe region concerned, with a laser light (inspection light), while imaging in the longitudinal direction (the x direction) of the stripe region concerned. In order to prevent a missing image, it is preferable that a plurality of inspection stripes 20 are set such that adjacent inspection stripes 20 overlap with each other by a predetermined margin width.

The imaging sensor 105 that continuously moves relatively in the x direction by the movement of the XYθ table 120 acquires optical images. The imaging sensor 105 continuously acquires optical images each having the scan width W as shown in FIG. 2. According to the first embodiment, after acquiring an optical image in one inspection stripe 20, the imaging sensor 105 moves in the y direction to the position of the next inspection stripe 20, and similarly acquires another optical image having the scan width W continuously while moving in the direction reverse to the last image acquiring direction. Thereby, the image acquiring is repeated in the forward (FWD) and backward (BWD) directions, namely changing the direction reversely when advancing and returning.

In an actual inspection, as shown in FIG. 2, the stripe region image of each inspection stripe 20 is divided into images of a plurality of rectangular (including square) frame regions 30. Then, inspection is performed for each image of the frame region 30. For example, it is divided into the size of 512×512 pixels. Therefore, a reference image to be compared with a frame image 31 of the frame region 30 is similarly generated for each frame region 30.

The direction of the image acquiring is not limited to repeating the forward (FWD) and backward (BWD) movement. Images may be acquired in a fixed one direction. For example, FWD and FWD may be repeated, or alternatively, BWD and BWD may be repeated.

As described above, the inspection apparatus 100 includes, in addition to the inspection optical system 175 (reflection inspection optical system and/or transmission inspection optical system), the autofocus mechanism 131 which detects a height-wise displacement of the substrate 101, being an inspection target object, displaced with respect to the inspection optical system 175.

With the recent miniaturization of patterns, the high numerical aperture (NA) of objective lenses has been increasing, and along with this, the focal depth of the inspection optical system 175 becomes shallow (short). Accordingly, although conventionally the accuracy of the measuring system installed independently close to the inspection optical system has been sufficient, it has become difficult to perform a highly accurate focus adjustment because various change factors (dependency on temperature/mechanical transformation) of the inspection optical system cannot be detected if not conducting (in-situ) measurement which uses the inspection optical system itself.

Thus, the autofocus mechanism is requested to further perform a function of detecting (monitoring) a change of the state of the inspection optical system in addition to a change of a signal output (sensor output) accompanied with a height change of a mask. Since the autofocus optical system has a configuration utilizing an inspection optical system, the method used therein has changed from that of using an objective lens (for two-wavelength aberration correction) adapted to an original measuring light source (red laser) to that of installing an optical system using a DUV light being an inspection light in accordance with a request of further high accuracy of the objective lens.

The autofocus optical system utilizing an inspection optical system employs an optical lever method conventionally well known where the measuring light source (red laser) is used, or a confocal optical system method. In both the methods, an illumination spot for measurement is projected onto a minute area on an inspection target. It is known that a diffracted light generated by a pattern causes an error of a measuring result since micropatterns are written on an inspection target object (mask). In order to minimize this error, the detector is precisely adjusted so that, in the case of the optical lever method, a diffracted light may not be a disturbance of the autofocus optical system because of shortening of the wavelength of the measuring light source, and so that, in the case of the confocal optical system method, the influence of a generated diffracted light may be cancelled out.

The adjustment described above is performed, after setting a test mask with written patterns of various sizes and shapes at a focus position of the inspection optical system when starting up the apparatus, in order that the same measurement value can be output with respect to any pattern. However, it has not been verified whether the same measurement value can be output with respect to any pattern when the height of the mask changes differently (displaced from the focus position). In the first place, to perform an inspection while being displaced from a focus position was not assumed because the premise was to extract clear images. Further, conventionally, there was no recognition of necessity of considering displacement from a focus position of the autofocus optical system which is generated due to a decrease of an allowable height displacement (focal depth) along with the recent miniaturization of patterns and the advancement of objective lenses with higher numerical apertures (NA).

In order to maintain the mask height to be constant with respect to the inspection optical system during an inspection, it is possible to employ a method of controlling to feed back an autofocus signal as a displacement signal of the stage moving minutely/finely in the height (Z) direction. For specifying a gain to be given to the control system, a linear signal change is measured, when starting up the apparatus, by moving up and down the mask which has a uniform reflection surface regarding the focus position (output 0 (zero)) as a reference. However, as described above, it has turned out that the gradient of a signal changes according to the type of pattern on the mask. Accordingly, the output of an autofocus signal at the time of displacing the height position by a certain amount from the focus position differs depending upon the type of pattern.

The problem in the case where a measurement error occurs due to a difference between types of patterns is not an issue as long as the error is equal to or less than a focal depth of the inspection optical system, or blur caused by a focus deviation is equal to or less than a required defect inspection sensitivity. However, with a decrease of a focal depth and an increase of a required inspection sensitivity of the inspection optical system, it has become difficult to ignore the influence of image blurring caused by a deviation between a focus position of the inspection optical system and that of the autofocus optical system.

Since the inspection optical system of the inspection apparatus needs to highly accurately detect various defects generated in micropatterns on an inspection target object, a function of extracting various optical properties of the inspection target object is installed. If the inspection target object (mask) is a transparent glass substrate on which a micropattern is formed by etching processing of the surface thin film, an image electric signal is acquired by enlarging a transmission/reflection image obtained from an illumination light with which the inspection target object is irradiated, and by putting the enlarged one into an image sensor. Regarding the EUV lithography technique responding to further miniaturization, it has become impossible, in the scanner whose illumination light wavelength is considerably shorter (up to 10 nm) than that of a DUV light and which transfers (exposes) a circuit pattern onto a wafer, to configure a reduction optical system using a lens. Accordingly, an EUV mask, to be installed, is configured where a micropattern formed on the surface is irradiated with an illumination light, and a reflected light of the illumination light from the EUV mask is put into a reduction optical system composed of many reflecting mirrors in order to form an image on the wafer. The size of a pattern formed on the surface of the EUV mask is now less than ½ (half pitch<40 nm) of an inspection light wavelength ($\lambda$=248 to 199 nm), and therefore, along with decrease of optical system resolution, detection of minute defects is realized by making full use of various special illuminations (polarization and spatial frequency modulation) in addition to a normal illumination.

Thus, in such an inspection optical system having various optical properties, it needs to change, according to inspection conditions, the setting (rotating around the optical axis, shifting on the basis of the optical axis, and adjusting a gradient) of a plurality of optical components in order to acquire an optimal optical condition. By this changing, an optical path length of the image forming optical system from an objective lens to an image sensor (TDI camera) changes, and even when the height of an inspection target is fixed against the objective lens, there is a case where the focus position of the image forming optical system is displaced with respect to the image sensor. Since, in accordance with advancement of apparatus starting/adjusting, a focus position of the image forming optical system gradually changes due to stabilization of a device installation environment, etc., a fine adjustment needs to be performed several times. Furthermore, it is necessary for an apparatus having been started up and adjusted to exert performance in a factory to repeat such an adjustment for performance exertion after delivered to a customer, which is coped with by beforehand installing a fine adjustment mechanism for detection optical system components.

Moreover, a focus position with respect to the image sensor (TDI camera) which converts an image of the image forming optical system into an electric signal can also be adjusted by changing the height of an inspection target object (mask). For example, the adjustment can be realized by giving an offset to a signal of the autofocus optical system, thereby performing a focus position correction between the inspection optical system and the inspection target object.

Figure 3:
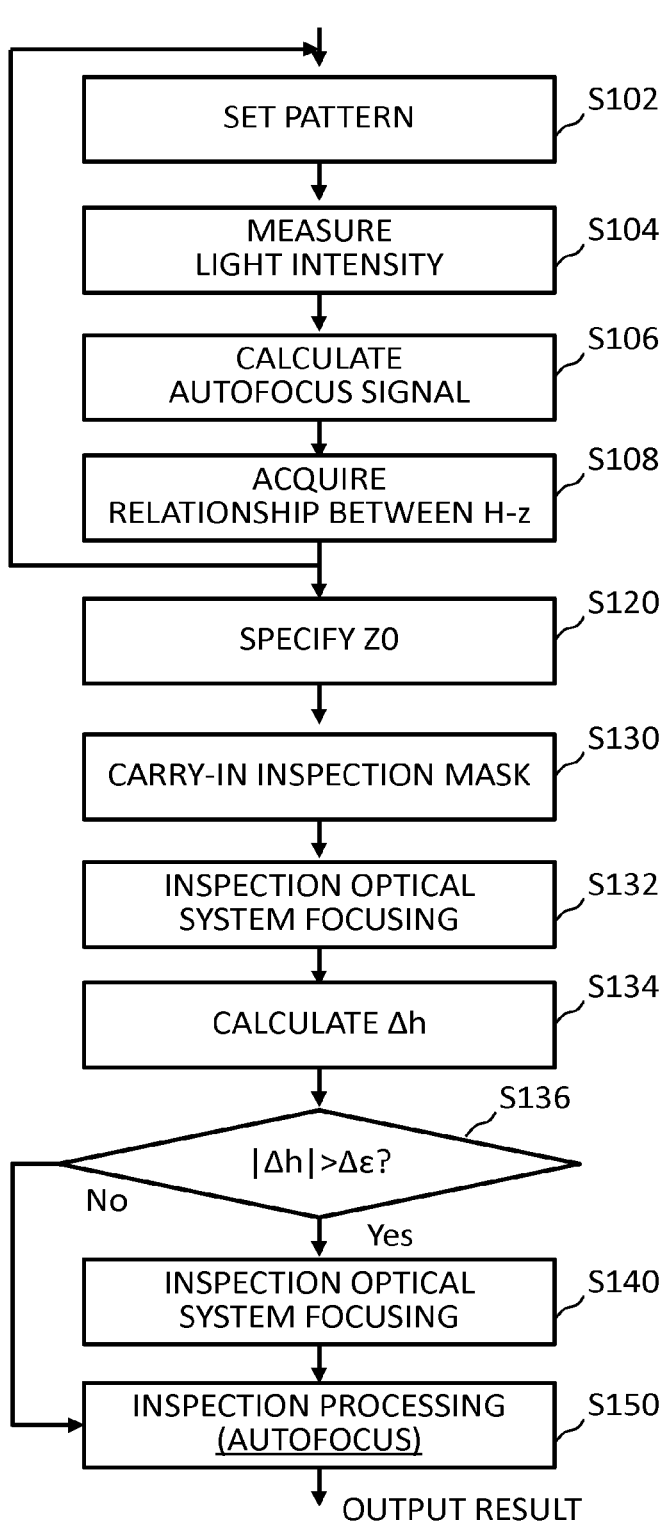
FIG. 3 is a flowchart showing an example of main steps of an inspection method according to the first embodiment.

The problem to be solved has been clarified, and therefore, the countermeasure is to correct a focus position of the inspection optical system by using the fine adjustment mechanism described above. With advancement of miniaturization (TN: Technology Node) of a semiconductor inspection pattern from two digits to one digit (20→14→10→7), decrease of image contrast of an inspection target pattern caused by focus displacement has been exposed. For example, in order to inhibit a contrast decrease in a line-and-space (LS) pattern of 100 nm order to 10% or less, it is necessary to inhibit a focus displacement to 50 nm or less. Then, according to the first embodiment, a method for preventing or reducing a measurement error of images to be acquired with respect to different types of patterns is described below referring to, as an example, the inspection apparatus 100 for inspecting an exposure mask. The detailed description is as follows:

FIG. 3 is a flowchart showing an example of main steps of an inspection method according to the first embodiment. In FIG. 3, the inspection method of the first embodiment executes a series of steps: a pattern setting step (S102), a light intensity measuring step (S104), an autofocus signal (z) calculating step (S106), a relationship acquiring step (S108) for between mask surface height (H) and autofocus signal (z), an autofocus-signal-for-inspection (Z0) specifying step (S120), an inspection mask carrying-in step (S130), an inspection optical system focusing step (S132), a height difference (Δh) calculating step (S134), a determining step (S136), an inspection optical system focusing step (S140), and an inspection processing (autofocus controlling) step (S150).

Figure 4:
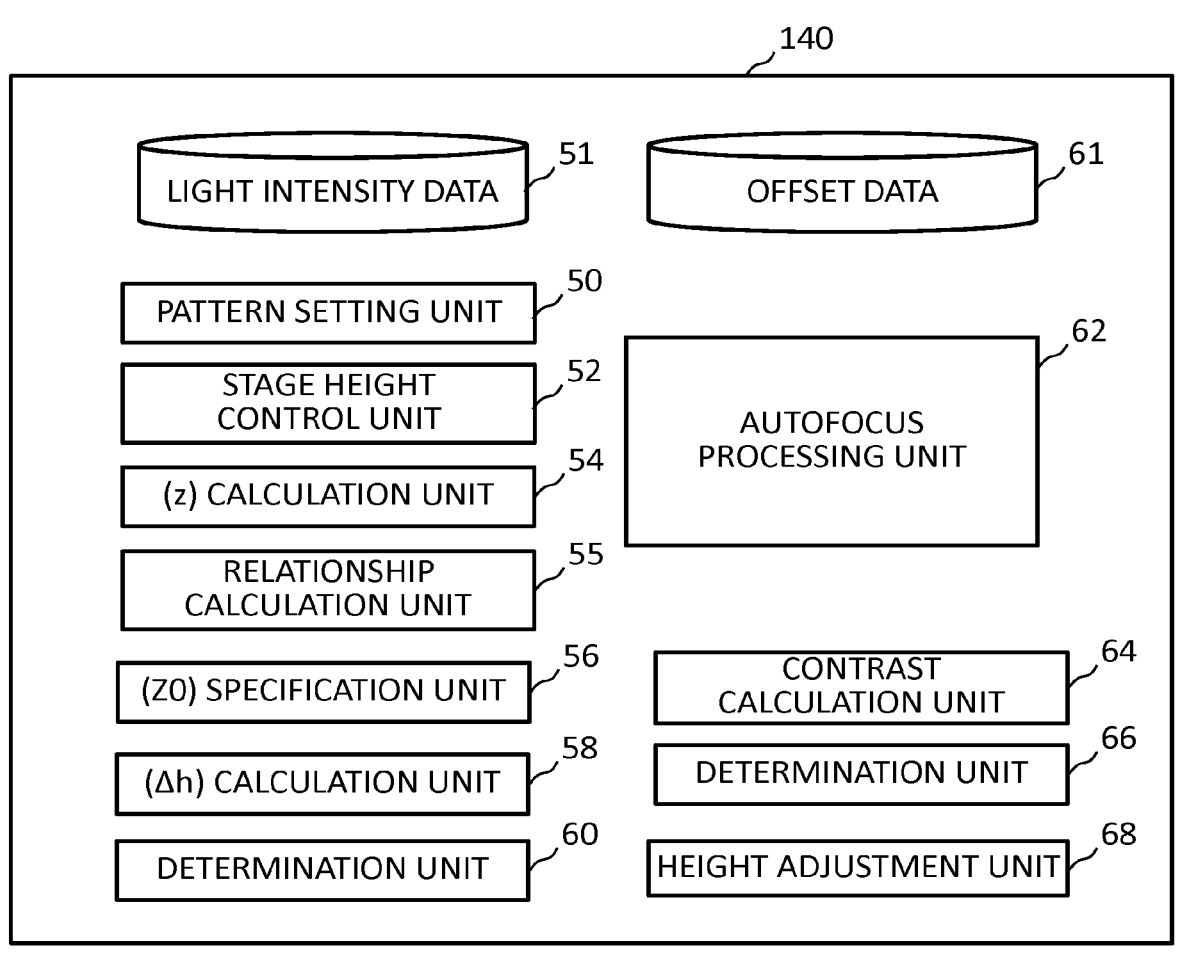
FIG. 4 is a block diagram showing an example of an internal configuration of an autofocus control circuit according to the first embodiment.

FIG. 4 is a block diagram showing an example of an internal configuration of an autofocus control circuit according to the first embodiment. In FIG. 4, in the autofocus control circuit 140, there are arranged storage devices 51 and 61 such as a magnetic disk drive, a pattern setting unit 50, a stage height control unit 52, an autofocus signal (z) calculation unit 54, a relationship calculation unit 55, an autofocus-signal-for-inspection (Z0) specification unit 56, a height difference (Δh) calculation unit 58, a determination unit 60, an autofocus processing unit 62, a contrast calculation unit 64, a determination unit 66, and a height adjustment unit 68. Each of the "units" such as the pattern setting unit 50, the stage height control unit 52, the autofocus signal (z) calculation unit 54, the relationship calculation unit 55, the autofocus-signal-for-inspection specification unit 56, the height difference calculation unit 58, the determination unit 60, the autofocus processing unit 62, the contrast calculation unit 64, the determination unit 66, and the height adjustment unit 68 includes processing circuitry. The processing circuitry includes an electric circuit, a computer, a processor, a circuit board, a quantum circuit, a semiconductor device, or the like. Each of the "units" may use common processing circuitry (the same processing circuitry), or different processing circuitry (separate processing circuitry). Input data required in the pattern setting unit 50, the stage height control unit 52, the autofocus signal calculation unit 54, the relationship calculation unit 55, the autofocus-signal-for-inspection specification unit 56, the height difference calculation unit 58, the determination unit 60, the autofocus processing unit 62, the contrast calculation unit 64, the determination unit 66, and the height adjustment unit 68, or calculated results are stored in a memory (not shown) of the comparison circuit 108, or in the memory 111 each time.

In the pattern setting step (S102), first, an evaluation substrate on which a plurality of types of figure patterns have been formed and whose pattern forming surface is in the state of facing downward is placed on the XYθ table 102. The pattern setting unit 50 sets one type of pattern out of the plurality of types of figure patterns. As the plurality of types of figure patterns, there are a line and space pattern, a hole pattern, and others. In the case of the figure patterns being line and space patterns, if their line widths, arrangement pitches, directions, or the like are different from each other, they are preferably regarded as different types of figure patterns. In the case of the figure patterns being hole patterns, if their sizes, directions, arrangement pitches, or the like are different from each other, they are preferably regarded as different types of figure patterns. The pattern size d can be defined by the following equation (1) using the light source wavelength λ of the inspection apparatus 100 and the numerical aperture NA of the optical system. It is preferable to set k to a value larger than 1. For example, it is preferable to set the value in the range of 1<k≤10.

$$\lambda/(2NA) \leq d \leq k(\lambda/(2NA)) \tag{1}$$

The table control circuit 114 moves the XYθ table 102 to the position where a figure pattern having been set is irradiated with an inspection light.

In the light intensity measuring step (S104), while varying the height position of the pattern forming surface of the evaluation substrate on which a plurality of types of figure patterns are formed, the light amount sensor 185 measures, for each pattern type, the light amount at the front focus position of a light having transmitted through or reflected from the evaluation substrate irradiated with an inspection light. Similarly, the light amount sensor 187 measures the light amount at the back focus position. The light amount at the front focus position and that of the back focus position are dependent on the height position of the pattern forming surface of the evaluation substrate. Specifically, it operates as follows:

It is premised that processing such as optical axis adjustment of the inspection apparatus 100 has been completed.

The appropriate light source 103 emits a laser light (e.g., DUV light) serving as an inspection light, whose wavelength is equal to or shorter than that of a light in the ultraviolet region, to the beam splitter 174 by the reflection illumination optical system 171. The laser irradiation light is reflected from the beam splitter 174, and applied to the evaluation substrate by the magnifying optical system 104. The light reflected from the evaluation substrate passes through the magnifying optical system 104 and the beam splitter 174, and is applied to the beam splitter 177. The light branched by the beam splitter 177 enters the autofocus optical system 180.

The light incident on the autofocus optical system 180 is refracted in the condensing direction by the image forming optical system 181, and applied to the beam splitter 182. The light transmitted through the beam splitter 182 is partially restricted by the slit plate 184 at the front focus position, and then, the amount of the light which has passed through the slit plate 184 is measured by the light amount sensor 185. The light branched by the beam splitter 182 is partially restricted by the slit plate 186 at the back focus position, and then, the amount of the light which has passed through the slit plate 186 is measured by the light amount sensor 187. By this, with respect to the figure pattern having been set, the light amount at the front focus position and that at the back focus position can be measured for each height position of the surface of the evaluation substrate. Each light amount data (light intensity data) on a measured light amount at the front focus position and that at the back focus position for each height position of the pattern forming surface of the evaluation substrate is stored, to be related to a height position, in the storage device 51.

The height position of the pattern forming surface of the evaluation substrate is variably controlled by the Z drive mechanism 132, by driving the height position of the XYθ table 102, under the control of the stage height control unit 52. The height position of the pattern forming surface is measured by the position sensor 134.

In the autofocus signal (z) calculating step (S106), the autofocus signal calculation unit 54 calculates, for each pattern type and for each height position of the evaluation substrate, an autofocus signal by using a measured light amount at the front focus position and that at the back focus position. An autofocus signal (z) is defined by the following equation (2) using a light amount A at the front focus position and a light amount B at the back focus position.

$$z=(A-B)/(A+B) \qquad (2)$$

Values of autofocus signals for respective height positions of the pattern forming surface of the evaluation substrate are stored in the storage device 51, for example.

In the relationship acquiring step (S108) for between mask surface height (H) and autofocus signal (z), the relationship calculation unit 55 calculates and acquires, for each pattern type, a relationship between a height position (mask surface height) (H) of the pattern forming surface of the evaluation substrate and a calculated autofocus signal (z). For example, the relationship is calculated as a linear proportional relation.

After having acquired a relationship between H and z with respect to one type, it returns to the pattern setting step (S102). Each step from the pattern setting step (S102) to the relationship acquiring step (S108) for between mask surface height (stage inspection surface) (H) and autofocus signal (z) is repeated until relationships between H and z of at least two types of patterns formed on the evaluation substrate have been acquired.

Figure 5:
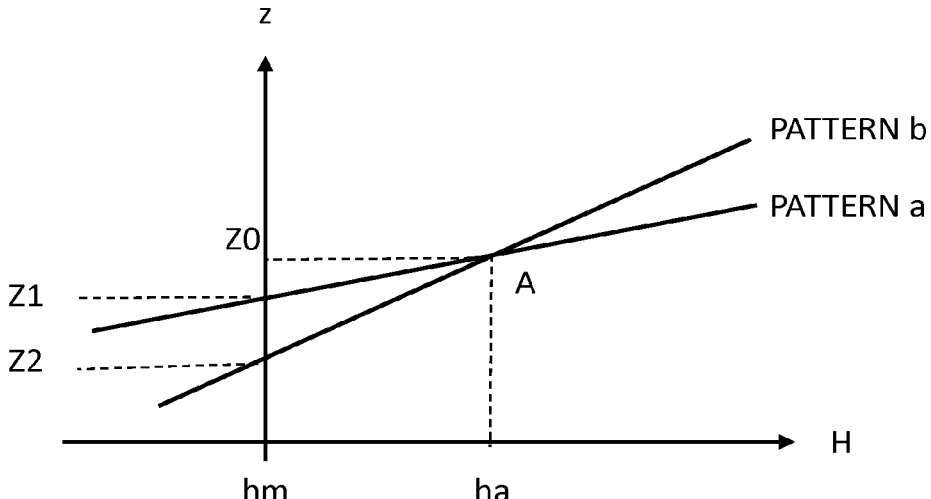
FIG. 5 is a graph diagram showing an example of a relationship between H and z according to the first embodiment.

FIG. 5 is a graph diagram showing an example of a relationship between H and z according to the first embodiment. In FIG. 5, the ordinate axis represents an autofocus signal (z), and the abscissa axis does a height position (mask surface height) (H) of a pattern forming surface. FIG. 5 shows relationships between H and z with respect to two types of patterns "a" and "b". As shown in FIG. 5, it turns out that gradients of the straight lines, each showing a relationship between H and z, of the patterns "a" and "b" are different from each other. In the case of FIG. 5, for example, Z1 is the autofocus signal of the pattern "a" at a focusing mask-surface height position hm which is in focus on the imaging sensor of the mask used as an inspection substrate. Z2 is the autofocus signal of the pattern "b" at the focusing mask-surface height position hm of the inspection substrate. Thus, at the focusing mask-surface height position hm of the inspection substrate, measured values of autofocus signals vary depending on the type of pattern. One cause of this may be that states of diffracted lights generated by the slit plates 184 and 186 are different from each other depending on the type of pattern and such a difference is appeared as a difference in light amounts.

In the autofocus-signal-for-inspection (Z0) specifying step (S120), the autofocus-signal-for-inspection specification unit 56 specifies a value (Z0) of an autofocus signal for inspection such that a difference between values of autofocus signals (z) of a plurality of types of figure patterns calculated at the same height position of the pattern forming surface of the evaluation substrate is equal to or less than a threshold value. Since FIG. 5 shows graphs, each with respect to a relationship between H and z, of two types of patterns, the two graphs (two straight lines) having different gradients intersect at one point. Therefore, values of autofocus signals (z) are coincident at the mask surface height ha of the intersecting point. Thus, this intersecting point serves as a position where the difference between values of the autofocus signals (z) is the smallest. That is, this difference is below a threshold value. Therefore, in the case of FIG. 5, the autofocus-signal-for-inspection specification unit 56 specifies the values of the autofocus signals (z) at the intersecting point as a value (Z0) of an autofocus signal for inspection. It is acceptable to use a position displaced from the intersecting point as long as a difference between values of autofocus signals (z) is equal to or less than a threshold value.

Figure 6:
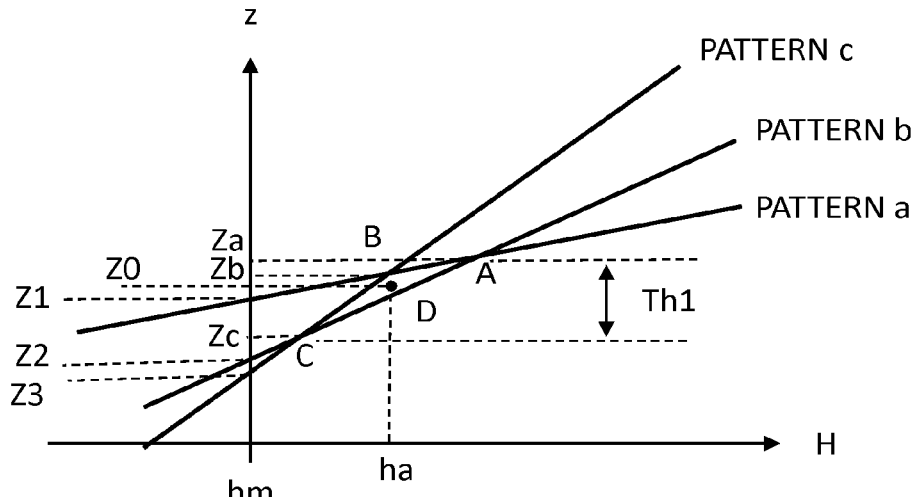
FIG. 6 is a graph diagram showing another example of a relationship between H and z according to the first embodiment.

FIG. 6 is a graph diagram showing another example of a relationship between H and z according to the first embodiment. In FIG. 6, the ordinate axis represents an autofocus signal (z), and the abscissa axis does a height position (mask surface height) (H) of a pattern forming surface. FIG. 6 shows relationships between H and z with respect to three types of patterns "a", "b" and "c". As shown in FIG. 6, it turns out that gradients of the straight lines, each showing a relationship between H and z, of the patterns "a", "b", and "c" are different from each other. In the case of FIG. 6, for example, Z1 is the autofocus signal of the pattern "a" at the focusing mask-surface height position hm of the inspection substrate. Z2 is the autofocus signal of the pattern "b" at the focusing mask-surface height position hm of the inspection substrate. Z3 is the autofocus signal of the pattern "c" at the focusing mask-surface height position hm of the inspection substrate. Thus, at the focusing mask-surface height position hm of the inspection substrate, measured values of autofocus signals vary depending on the type of pattern. Furthermore, FIG. 6 shows the case where the three straight lines, each showing a relationship and having a different gradient, do not intersect at one point. The patterns "a" and "b" intersect at the intersecting point A, the patterns "a" and "c" do at the intersecting point B, and the patterns "b" and "c" do at the intersecting point C. If all the straight lines intersect at one point, values of the autofocus signals (z) at the one intersecting point can be specified as a value (Z0) of the autofocus signal for inspection. However, as shown in FIG. 6, when all the straight lines do not intersect at one point, the autofocus signal (Z0) for inspection is specified such that the following condition (1) should be fulfilled.

(1): The value of a difference between autofocus signals (z), each of which is calculated based on each pattern type, at the same height position of the pattern forming surface of the evaluation substrate is equal to or less than a threshold value Th1.

Further, it is preferable that the following condition (2) is added.

(2): In a plurality of values of autofocus signals which are obtained for each combination of two types of patterns and are coincident at the same height position of the evaluation substrate, a value between the maximum value and the minimum value is used. In the case of FIG. 6, for example, Za is the autofocus signal (z) at the inspecting point A, Zb is the autofocus signal (z) at the inspecting point B, and Zc is the autofocus signal (z) at the inspecting point C, wherein Za>Zb>Zc. Therefore, the autofocus signal (Z0) for inspection is between the maximum Za and the minimum Zc.

Therefore, in the example of FIG. 6, the autofocus signal (z) of the point D which fulfills the conditions (1) and (2) is specified as the autofocus signal (Z0) for inspection. Preferably, the point D is in the region surrounded by the intersecting points A, B, and C.

Further, it is preferable to specify, as the autofocus signal (Z0) for inspection, a value of an autofocus signal at the height position where a deviation between differences each between values of autofocus signals (z), each of the differences being calculated for each combination of two types of patterns, is smaller than others. In the case of FIG. 6, since the difference between Zb and Zc is larger than that between Za and Zb, an intermediate value between Zb and the autofocus signal (z) of the pattern b at the mask surface height position of the intersecting point B is preferably specified as the autofocus signal (Z0) for inspection, for example.

Furthermore, it is preferable, if values of autofocus signals each of which is calculated based on each pattern type are coincident at the same height position of the evaluation substrate, to use the coincident value as the autofocus signal (Z0) for inspection. In other words, with respect to not only two types of patterns but also three or more types of patterns, if all of a plurality of straight lines, each showing a relationship between H and z and having a different gradient, intersect at one point, the value of the autofocus signal at this intersecting point is preferably specified as the autofocus signal (Z0) for inspection.

The specified value (Z0) of the autofocus signal for inspection is stored in the storage device 51, to be related to the mask surface height ha corresponding to the value (Z0) of the autofocus signal for inspection. The evaluation substrate is carried out from the XYθ table 102.

In the inspection mask carrying-in step (S130), the substrate 101 used as the inspection substrate transferred from the autoloader 130 is arranged on the XYθ table 102. Two or more types of figure patterns out of a plurality of types of patterns formed on the evaluation substrate are formed on the substrate 101. The size of the figure patterns to be inspected on the substrate 101 is generally formed to a size commensurate with the performance of the inspection apparatus 100.

In the inspection optical system focusing step (S132), the autofocus control circuit 140 adjusts the mask surface height to the focusing mask-surface height position hm which is in focus on the imaging sensor 105 acquiring an inspection optical image. Being in focus on the imaging sensor 105 means a position at which the contrast of an acquired optical image is the maximum or equal to or more than a threshold Th2.

Then, the contrast calculation unit 64 acquires, while varying the height of the XYθ table 102, an optical image of the substrate 101 at each mask surface height position, and calculates a contrast of an acquired optical image.

Under the control of the stage height control unit 52, the height position of the pattern forming surface of the substrate 101 is variably controlled by driving the height position of the XYθ table 102 by the Z drive mechanism 132. The height position of the pattern forming surface is measured by the position sensor 134.

The determination unit 66 determines that, with respect to optical images acquired at respective mask surface height positions, the mask surface height position at which an optical image having a contrast of the maximum or equal to or more than the threshold Th2 is acquired is the focusing mask surface height position hm.

After setting the test mask with test patterns of various sizes and shapes thereon at the time of starting up the apparatus to the focusing mask surface height position (focus position) of the inspection optical system 175, the sensor circuit 106 is adjusted such that the same measurement value (gray-scale level value of an image) is output for any pattern with respect to white and black parts. The line width size of the figure patterns to be inspected formed on the substrate 101 serving as the substrate to be inspected is generally set to a size commensurate with the performance of the inspection apparatus 100. Therefore, similarly to the figure pattern formed on the evaluation substrate, the focusing mask-surface height position hm can be obtained.

In the height difference (Δh) calculating step (S134), the height difference calculation unit 58 calculates a difference Δh (=hm−ha) by calculating a difference between the mask surface height ha corresponding to the value (Z0) of an autofocus signal for inspection and the focusing mask-surface height position hm of the inspection optical system 175.

In the determining step (S136), the determination unit 60 determines whether a difference Δh (=hm−ha) (here, an absolute value |Δh|), which is a difference between the focusing mask-surface height position hm (height position) being a focus position of the inspection optical system 175 and the height position (ha) of the pattern forming surface of the evaluation substrate corresponding to the value (Z0) of the autofocus signal for inspection, is larger than a threshold Δε (second threshold) or not. If the difference Δh is not larger the threshold Δε, since it is within an acceptable range, the process goes to the inspection processing (autofocus controlling) step (S150). If it is larger, the process goes to the inspection optical system focusing step (S140).

In the inspection optical system focusing step (S140), when the difference Δh (=hm−ha) (here, an absolute value |Δh|) is larger than the threshold Δε, the height adjustment unit 68 adjusts the inspection optical system 175 such that the focus position of the inspection optical system 175 becomes the height position (ha) of the pattern forming surface of the evaluation substrate corresponding to the value (Z0) of the autofocus signal for inspection.

Figure 7:
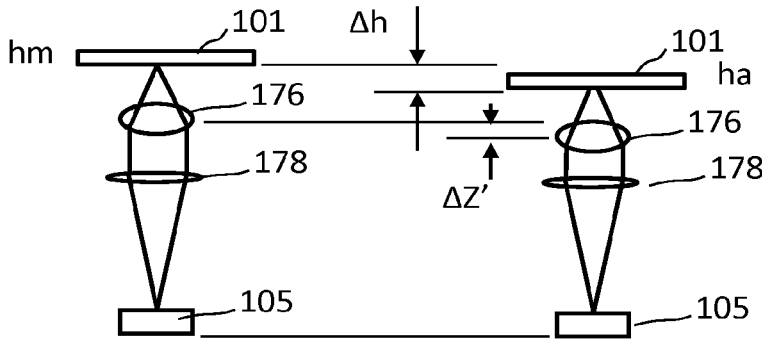
FIG. 7 is an illustration for explaining an example of a method for focusing of an inspection optical system according to the first embodiment.

FIG. 7 is an illustration for explaining an example of a method for focusing of an inspection optical system according to the first embodiment. In the case of FIG. 7, the configuration of FIG. 1 is simplified. In FIG. 7, before adjustment, the focus position of the inspection optical system 175 of the substrate 101 used as the inspection substrate has been in focus at the focusing mask-surface height position hm. Starting from this state, adjustment is performed, while varying the height position of the collimating lens 176, such that the focus position of the inspection optical system 175 becomes the height position (ha) of the pattern forming surface. Preferably, the height adjustment unit 68 controls the height position of the collimating lens 176 by controlling the Z drive mechanism 136. Alternatively, the height position of the collimating lens 176 may be changed by operator manual actions, etc. In the case of FIG. 7, by changing (moving) (e.g., in this case, moving downward) the height position of the collimating lens 176 by ΔZ', the focus position of the inspection optical system 175 is adjusted to the mask surface height position ha.

As described above, the focus position of the inspection optical system 175, which is in focus on the imaging sensor

105, is a position where the contrast of an acquired optical image is the maximum or equal to or more than the threshold Th2.

Figure 8:
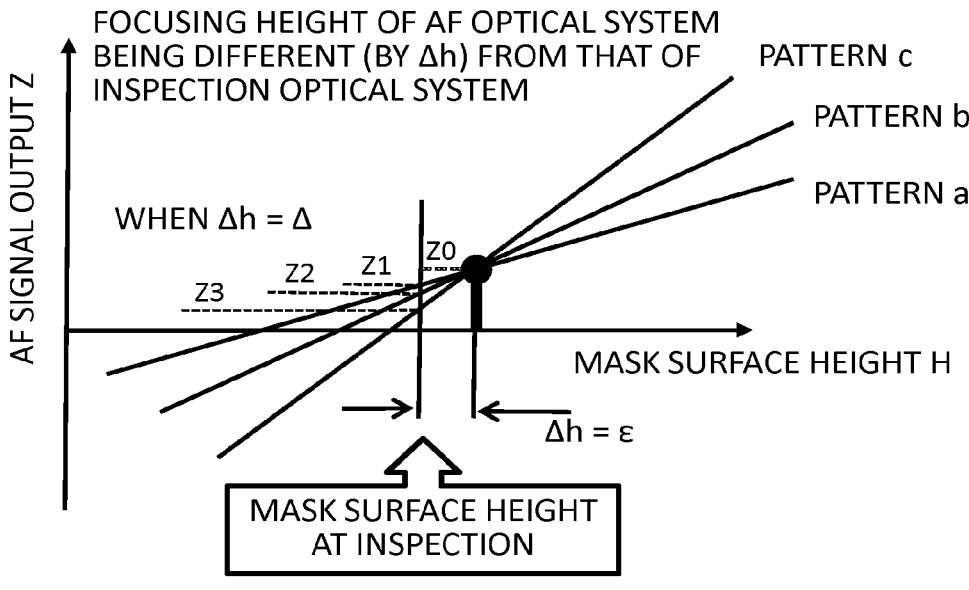
FIG. 8 is a graph diagram showing an example of a relationship between H and z according to a comparative example of the first embodiment.

FIG. 8 is a graph diagram showing an example of a relationship between H and z according to a comparative example of the first embodiment. In FIG. 8, the ordinate axis represents an autofocus signal (z), and the abscissa axis does a height position (mask surface height) (H) of a pattern forming surface. FIG. 8 shows relationships between H and z with respect to three types of patterns "a", "b" and "c". FIG. 8 shows the case where three straight lines, showing three relationships and having different gradients, intersect at one point. In the comparative example, the focus position of the inspection optical system 175 is in focus at the mask surface height position (hm) before adjustment, not at the mask surface height position (ha) corresponding to the value (Z0) of the autofocus signal for inspection.

Figure 9:
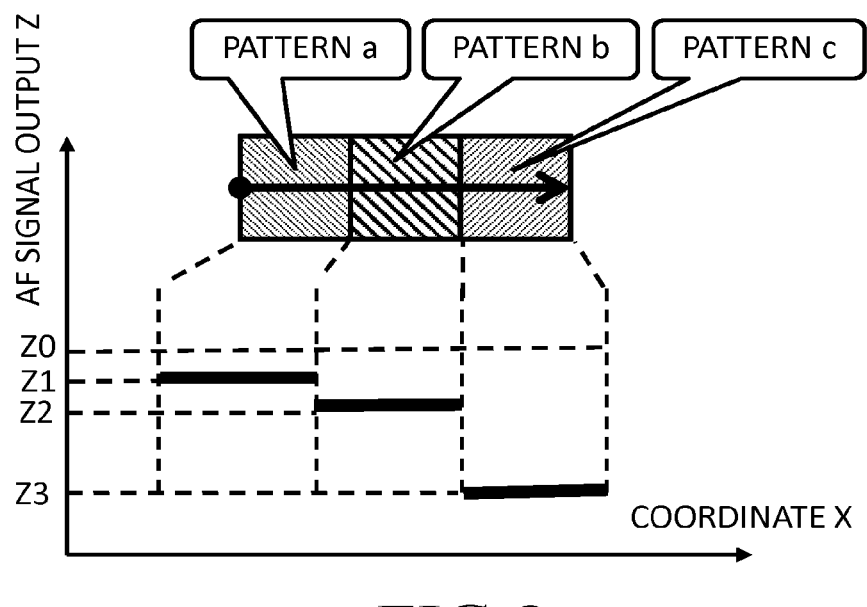
FIG. 9 is a diagram showing an example of an output of an autofocus optical system depending on a pattern according to the comparative example of the first embodiment.

FIG. 9 is a diagram showing an example of an output of an autofocus optical system depending on a pattern according to the comparative example of the first embodiment. In FIG. 9, the ordinate axis represents an output of the autofocus optical system, and the abscissa axis does a position within a mask surface. As shown in FIG. 8, at the mask surface height position (hm), autofocus signals (z) are Z1, Z2, and Z3 for different types of the patterns "a", "b", and "c". Therefore, as shown in FIG. 9, in actual image acquiring, though imaging the pattern "a" is based on the mask surface height position (hm), Z1 is output as an autofocus signal (z). Though imaging the pattern "b" is based on the mask surface height position (hm), Z2 is output as an autofocus signal (z). Though imaging the pattern "c" is based on the mask surface height position (hm), Z3 is output as an autofocus signal (z). Thus, output autofocus signals (z) are different from each other depending on the type of pattern. As a result, mask surface height positions to be adjusted by the autofocus mechanism become different from each other, which results in blurring of an optical image obtained by the imaging sensor 105.

Figure 10:
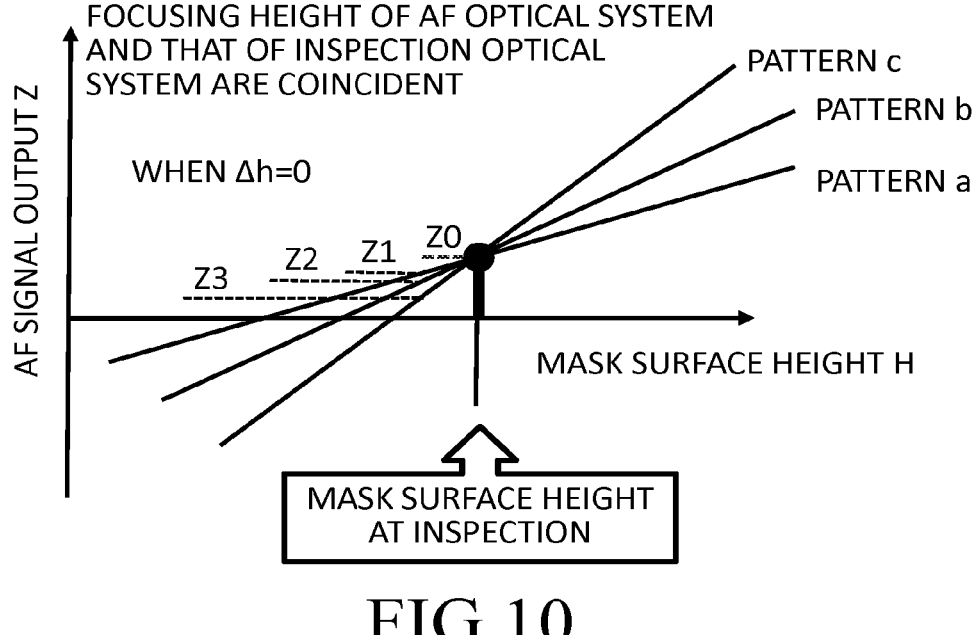
FIG. 10 is a graph diagram showing an example of a relationship between H and z according to the first embodiment.

FIG. 10 is a graph diagram showing an example of a relationship between H and z according to the first embodiment. In FIG. 10, the ordinate axis represents an autofocus signal (z), and the abscissa axis does a height position (mask surface height) (H) of a pattern forming surface. FIG. 10 shows relationships between H and z with respect to three types of patterns "a", "b" and "c". FIG. 10 shows the case where three straight lines, showing three relationships and having different gradients, intersect at one point. In the first embodiment, the focus position of the inspection optical system 175 is in focus at the mask surface height position (ha) corresponding to the value (Z0) of the autofocus signal for inspection.

Figure 11:
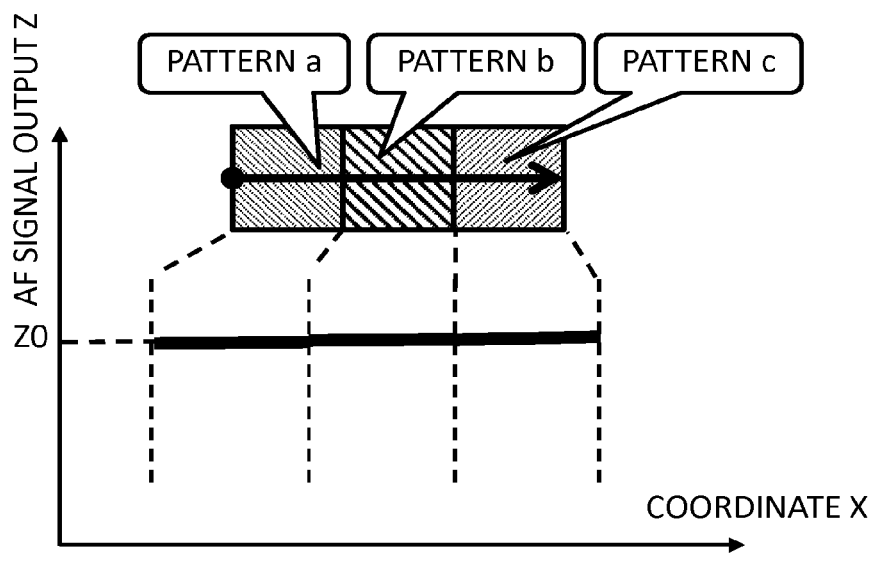
FIG. 11 is a diagram showing an example of an output of an autofocus optical system depending on a pattern according to the first embodiment.

FIG. 11 is a diagram showing an example of an output of an autofocus optical system depending on a pattern according to the first embodiment.

Figure 12:
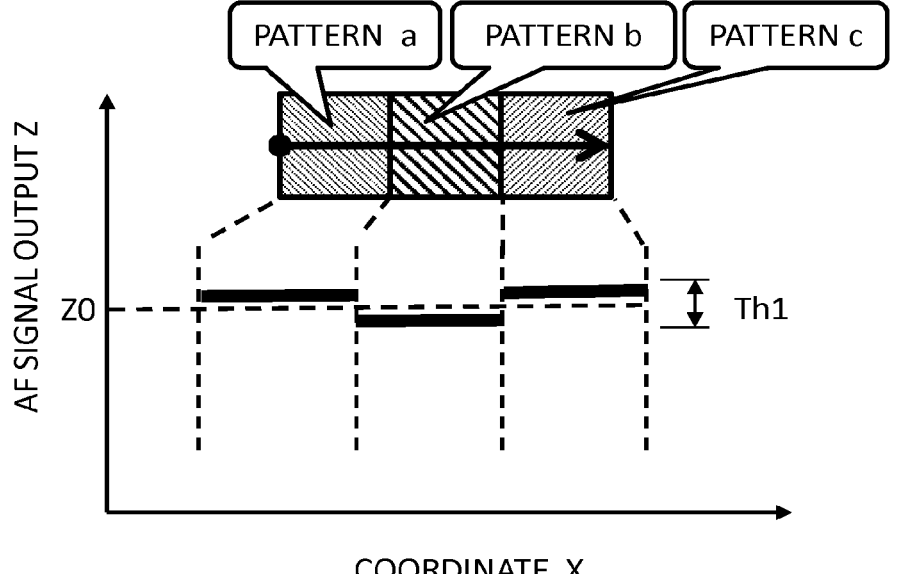
FIG. 12 is a diagram showing another example of an output of an autofocus optical system depending on a pattern according to the first embodiment.

FIG. 12 is a diagram showing another example of an output of an autofocus optical system depending on a pattern according to the first embodiment. In FIGS. 11 and 12, the ordinate axis represents an output of the autofocus optical system, and the abscissa axis does a position within a mask surface. As shown in FIG. 10, at the mask surface height position (ha), autofocus signals (z) are the same value Z0 for different types of the patterns "a", "b", and "c". Therefore, as shown in FIG. 11, in actual image acquiring, Z0 is output as an autofocus signal (z) at each of imaging the patterns "a", "b", and "c". Alternatively, even when three straight lines, showing three relationships and having different gradients, do not intersect at one point, as shown in FIG. 12, in actual image acquiring, each autofocus signal (z) is within the range of the threshold Th1 at each of imaging the patterns "a", "b", and "c". Thus, it does not occur that output autofocus signals (z) are different from each other depending on the type of pattern. Alternatively, deviation of an output autofocus signal (z) can be inhibited within the range of the threshold Th1. Accordingly, mask surface height positions adjusted by the autofocus mechanism can be the same or within an acceptable range. Therefore, blurring of optical images obtained by the imaging sensor 105 can be prevented or reduced.

In the inspection processing (autofocus controlling) step (S150), first, in the state where the substrate 101 used as an inspection substrate is placed on the XYθ table 102, while adjusting the height position of the pattern forming surface of the substrate 101, which may be changed with a horizontal direction movement of the XYθ table 102, to the height position (ha) of the pattern forming surface corresponding to the value (Z0) of the autofocus signal for inspection, the optical image acquisition mechanism 150 acquires an optical image of the inspection substrate which is for inspecting defects of two or more types of figure patterns by receiving, by the imaging sensor 105 through the inspection optical system 175, a transmitted or reflected light from the substrate 101 irradiated with an inspection light. Specifically, it operates as follows:

The optical image acquisition mechanism 150 acquires, for each inspection stripe 20, a stripe region image by the imaging sensor 105 by scanning the inspection stripe 20 with a laser beam (inspection light). Specifically, it operates as follows: The XYθ table 102 is moved to a position where an image of the target inspection stripe 20 can be acquired. In a transmission inspection, a pattern formed on the substrate 101 is irradiated with a laser light (e.g., DUV light) serving as an inspection light, whose wavelength is equal to or shorter than that of a light in the ultraviolet region, from the suitable light source 103 through the transmission illumination optical system 170. In other words, the transmission illumination optical system 170 illuminates the inspection substrate on which a pattern has been formed. A light having passed through the substrate 101 is focused, via the magnifying optical system 104 and the collimating lens 176, to form an optical image to be incident on the imaging sensor 105 (an example of a sensor) by the image forming optical system 178.

Alternatively, in a reflection inspection, the beam splitter 174 is irradiated with a laser light (e.g., DUV light) serving as an inspection light, whose wavelength is equal to or shorter than that of a light in the ultraviolet region, from the suitable light source 103 by the reflection illumination optical system 171. The laser irradiation light is reflected from the beam splitter 174, and applied to the target object 101 by the magnifying optical system 104. A light reflected from the target object 101 is focused, through the magnifying optical system 104, the beam splitter 174, and the collimating lens 176, to form an optical image to be incident on the imaging sensor 105 by the image forming optical system 178.

When acquiring such an optical image, the autofocus mechanism 131 adjusts, in the state where the substrate 101 is placed on the XYθ table 102, the mask surface height position of the substrate 101, which may be changed with a horizontal direction movement of the XYθ table 102, to the mask surface height position (ha) corresponding to the autofocus signal (Z0) for inspection. Specifically, the autofocus processing unit 62 inputs the light amount at the front focus position and that at the back focus position from the light amount sensors 185 and 187, and calculates an auto-focus signal. Then, the Z drive mechanism 132 is controlled such that an autofocus signal becomes Z0.

In the state where the height position of the pattern forming surface of the substrate 101 has been adjusted to the height position (ha) of the pattern forming surface corresponding to the value (Z0) of the autofocus signal for inspection, the imaging sensor 105 acquires an optical image of the substrate 101, which is for inspecting defects of two or more types of figure patterns, by receiving a transmitted or reflected light from the substrate 101 irradiated with an inspection light.

A pattern image focused/formed on the imaging sensor 105 is photoelectrically converted by each photo sensor element of the imaging sensor 105, and further, analog-to-digital (A/D) converted by the sensor circuit 106. Data of the pixel value of the inspection stripe 20 to be measured is stored in the stripe pattern memory 123. Measurement data (pixel data) is, for example, 8-bit unsigned data, and indicates a gray scale level of brightness (light amount) of each pixel.

The reference image generation circuit 112 generates, using figure pattern data (design data), a reference image serving as a reference. Generating a reference image is carried out, for each inspection stripe 20, in parallel to a scanning operation of the inspection stripe 20 concerned. Specifically, it operates as follows: The reference image generation circuit 112 inputs figure pattern data (design data) with respect to each frame region 30 of the target inspection stripe 20, and converts each figure pattern defined by the input figure pattern data into image data in binary or multiple values.

Basic figures defined by the figure pattern data are, for example, rectangles and triangles. For example, figure data which defines the shape, size, position, and the like of each pattern figure is stored by using information, such as coordinates (x, y) of a reference position of the figure, lengths of sides of the figure, and a figure code serving as an identifier for identifying the figure type such as rectangles and triangles.

When design pattern data used as the figure data is input to the reference image generation circuit 112, the data is developed into data of each figure. Then, the figure code, the figure dimensions, and the like indicating the figure shape of each figure data are interpreted. Then, the reference image generation circuit 112 develops each figure data to design pattern image data in binary or multiple values as a pattern to be arranged in squares in units of grids of predetermined quantization dimensions, and outputs the developed data. In other words, the reference image generation circuit 112 reads design data, calculates an occupancy rate of the figure in the design pattern, for each square region obtained by virtually dividing the frame region into squares in units of predetermined dimensions, and outputs n-bit occupancy data (design image data). For example, it is preferable to set one square as one pixel. Assuming that one pixel has a resolution of $\frac{1}{2}^8$ ($=\frac{1}{256}$), the occupancy rate in each pixel is calculated by allocating sub-regions, each having $\frac{1}{256}$ resolution, which correspond to the region of a figure arranged in the pixel. Then, it becomes 8-bit occupancy data. Such square regions (inspection pixels) can be corresponding to (commensurate with) pixels of measured data.

Next, the reference image generation circuit 112 performs filtering processing, using a filter function, on design image data of a design pattern being image data of a figure.

Figure 13:
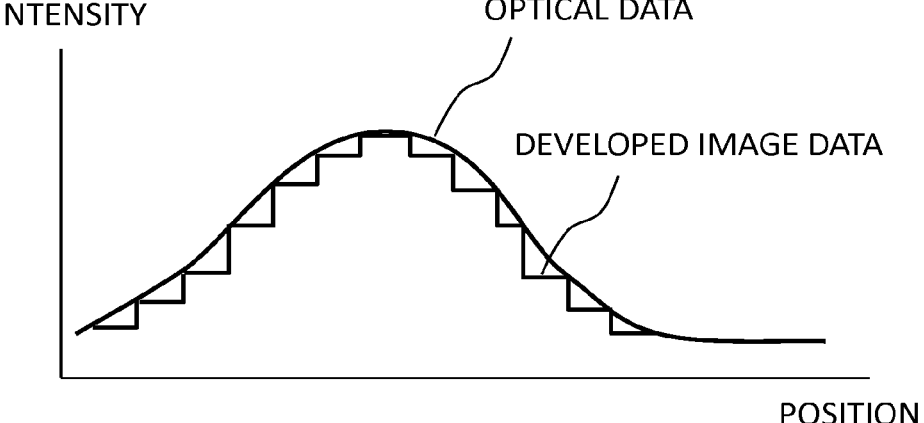
FIG. 13 is a diagram illustrating filter processing according to the first embodiment.

FIG. 13 is a diagram illustrating filter processing according to the first embodiment. Since pixel data of an optical image acquired from the substrate 101 is in a state affected by filtering due to resolution characteristics etc. of the optical system used for image-acquiring, in other words, in an analog state continuously changing, as shown in FIG. 13, for example, the optical image is different from the developed image (design image) whose image intensity (gray scale value) is represented by digital values. By contrast, in figure pattern data, since pattern codes, etc. are used for defining as described above, image intensity (gray scale level) of developed design images may be digital values. Accordingly, the reference image generation circuit 112 performs image processing (filter processing) on the developed image in order to generate a reference image close to the optical image. Thereby, it is possible to match design image data being design side image data, whose image intensity (gray scale level) is in digital values, with image generation characteristics of measured data (optical image). The generated reference image is output to the comparison circuit 108.

Figure 14:
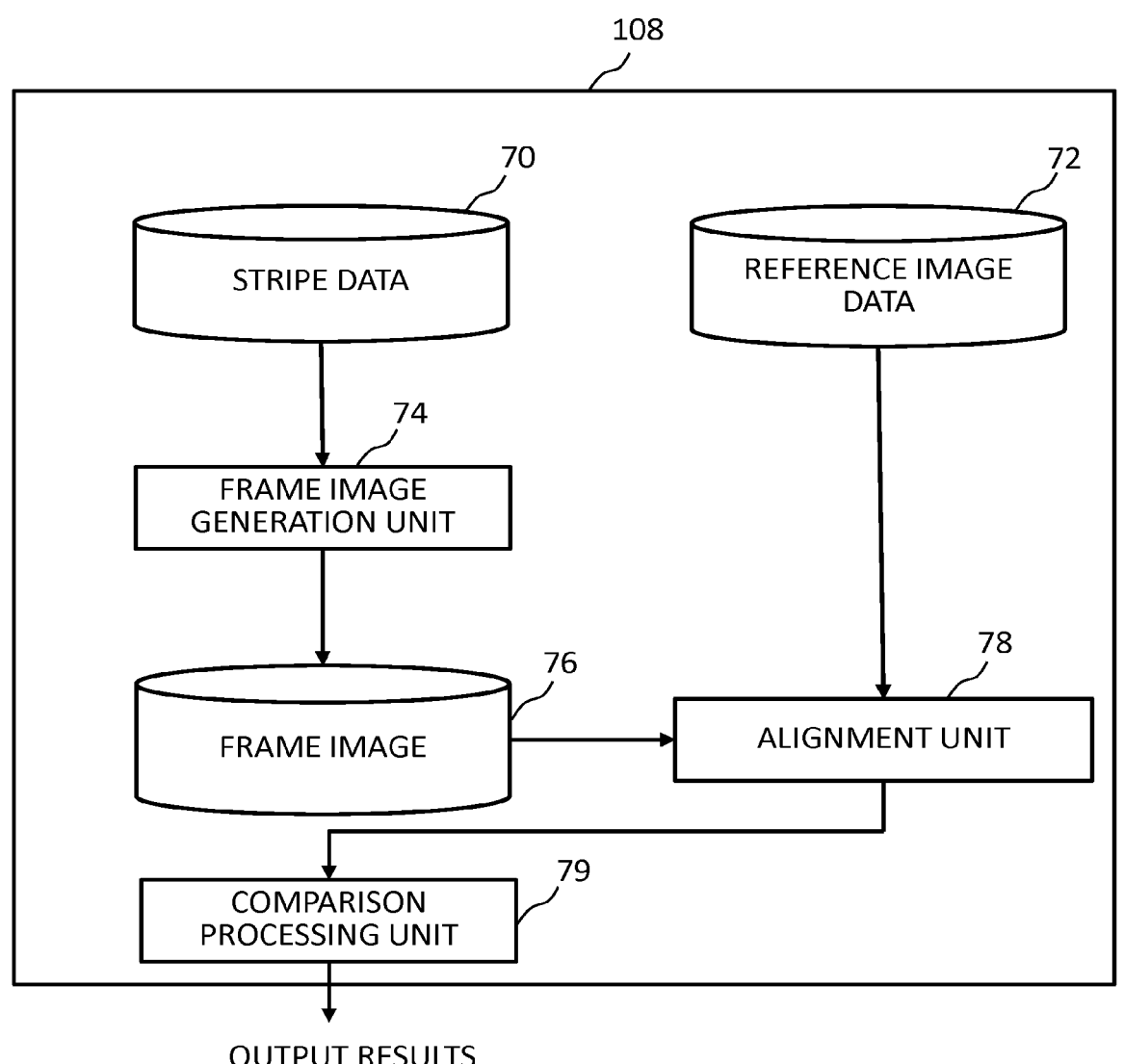
FIG. 14 is an example of an internal configuration of a comparison circuit according to the first embodiment.

FIG. 14 is an example of an internal configuration of a comparison circuit according to the first embodiment. As shown in FIG. 14, in the comparison circuit 108, there are disposed storage devices 70, 72, and 76 such as magnetic disk drives, a frame image generation unit 74, an alignment unit 78, and a comparison processing unit 79. Each of the "units" such as the frame image generation unit 74, the alignment unit 78, and the comparison processing unit 79 includes processing circuitry. The processing circuitry includes, for example, an electric circuit, a computer, a processor, a circuit board, a quantum circuit, semiconductor device, or the like. Further, common processing circuitry (the same processing circuitry), or different processing circuitry (separate processing circuitry) may be used for each of the " . . . units". Input data required in the frame image generation unit 74, the alignment unit 78, and the comparison processing unit 79, and calculated (operated) results are stored in a memory (not shown) in the comparison circuit 108 or in the memory 111 each time.

Stripe data (stripe region image) input to the comparison circuit 108 is stored in the storage device 70. Reference image data input to the comparison circuit 108 is stored in the storage device 72.

In the comparing step (S106), the comparison circuit 108 (example of a comparison unit) compares an optical image formed by optical image data output from the imaging sensor 105 with a reference image. Specifically, it operates as follows:

In the comparison circuit 108, first, the frame image generation unit 74 generates a plurality of frame images 31 by dividing the stripe region image (optical image) by a predetermined width. Specifically, as shown in FIG. 2, a stripe region image is divided into frame images of a plurality of rectangular frame regions 30. For example, it is divided into the size of 512×512 pixels. Data of each frame region 30 is stored in the storage device 76.

Next, the alignment unit 78 reads, for each frame region 30, a corresponding frame image 31 and a corresponding reference image from the storage devices 72 and 76, and performs alignment (position adjustment) of the frame image 31 and the corresponding reference image based on a predetermined algorithm. For example, the alignment is performed according to the least-square method.

The comparison processing unit 79 (another example of the comparison unit) compares the frame image 31 with the reference image corresponding to the frame image 31 concerned. For example, comparing is performed for each pixel. Here, the comparison processing unit 79 compares, for each pixel, both the images based on predetermined determination conditions in order to determine whether there is a defect, such as a shape defect, or not. For example, based on predetermined algorithm as the determination conditions, both the images are compared each other for each pixel to determine whether there is a defect or not. For example, for each pixel, a difference value between pixel values of the optical image and the reference image is calculated, and it is determined there is a defect when the difference value is larger than a threshold Th. Then, the comparison result is output to, for example, the magnetic disk drive 109, the magnetic tape drive 115, the flexible disk drive (FD) 116, the CRT 117, or the pattern monitor 118, or alternatively, output from the printer 119.

Although the case of performing the die-to-database inspection is described in the above example, the die-to-die inspection may also be used. In that case, with respect to frame regions of dies 1 and 2 for the die-to-die inspection in a plurality of frame regions 30, the comparison circuit 108 uses a frame image (optical image) of the die 2, as a reference (reference image). First, for each frame region 30 to which the die-to-die inspection is performed, the alignment unit 78 reads the frame image 31 of the die 1 and a corresponding frame image of the die 2 from the storage device 76, and performs alignment between the frame image 31 of the die 1 and the frame image of the die 2 based on a predetermined algorithm. For example, the alignment is performed using the least-square method. Then, for each frame region 30 to which the die-to-die inspection is performed, the comparison processing unit 79 (comparison unit) compares, for each pixel, the frame image 31 of the die 1 with the corresponding frame image of the die 2.

In the case described above, using the evaluation substrate, the relationship between H and z for each pattern type in a plurality of types of patterns is obtained to specify the value (Z0) of an autofocus signal for inspection, but it is not limited thereto. Similarly to the case of the evaluation substrate, the value (Z0) of an autofocus signal for inspection may also be specified, using an inspection substrate on which a plurality of types of figure patterns are formed, by acquiring the relationship between H and z for each pattern type in the plurality of types of figure patterns. In that case, in the state where the inspection substrate is placed on the stage, while adjusting the mask surface height position, which may be changed with a horizontal direction movement of the XYθ table 102, to the mask surface height position (ha) corresponding to the value (Z0) of the autofocus signal for inspection, an optical image of the inspection substrate, which is for inspecting defects of the plurality of types of figure patterns, is acquired by receiving, by the imaging sensor 105 through the inspection optical system 175, a transmitted or reflected light from the inspection substrate irradiated with an inspection light.

As described above, according to the first embodiment, errors of the height position of a substrate pattern forming surface adjusted at the time of autofocusing, which occur because of a difference of pattern types formed on the substrate such as a mask, can be prevented or reduced.

Embodiments have been explained referring to specific examples described above. However, the present invention is not limited to these specific examples.

While the apparatus configuration, control method, and others not directly necessary for explaining the present invention are not described, some or all of them can be appropriately selected and used on a case-by-case basis when needed. For example, although description of the configuration of the control unit for controlling the inspection apparatus 100 is omitted, it should be understood that some or all of the configuration of the control unit can be selected and used appropriately when necessary.

In addition, any adjustment method of an inspection apparatus focus position and any pattern inspection apparatus that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for adjusting a focus position of an inspection apparatus, comprising:

measuring, while varying a height position of a pattern forming surface of an evaluation substrate on which a plurality of types of figure patterns are formed, for each of the plurality of types of figure patterns, a light amount at a front focus position and a light amount at a back focus position of one of a light transmitted through the evaluation substrate and a light reflected from the evaluation substrate irradiated with an inspection light;

calculating an autofocus signal, for the each of the plurality of types of figure patterns and for each the height position of the pattern forming surface of the evaluation substrate, by using the light amount measured at the front focus position and the light amount measured at the back focus position;

specifying a value of an autofocus signal for inspection such that a difference between values of autofocus signals of the plurality of types of figure patterns calculated at a same height position of the pattern forming surface of the evaluation substrate is one of equal to and less than a threshold value; and acquiring, in a state where an inspection substrate on which at least two types of figure patterns out of the plurality of types of figure patterns are formed is placed on a stage, while adjusting a height position of a pattern forming surface of the inspection substrate, which may be changed with a horizontal direction movement of the stage, to a height position of the pattern forming surface corresponding to the value of the autofocus signal for inspection, an optical image of the inspection substrate by receiving by a sensor, through an inspection optical system, one of a light transmitted through the inspection substrate and a light reflected from the inspection substrate irradiated with an inspection light.

2. The method according to claim 1, wherein a value of an autofocus signal at a same height position of the pattern forming surface of the evaluation substrate, where values of autofocus signals of the plurality of types of figure patterns calculated are coincident, is used as the value of the autofocus signal for inspection.

3. The method according to claim 1, wherein at least three types of figure patterns are used as the plurality of types of figure patterns, and a value between a maximum value and a minimum value in a plurality of values of autofocus signals each calculated for each combination of two types of figure patterns and each being a value at a same height position of the pattern forming surface of the evaluation substrate, where values of autofocus signals of a combination of two types of figure patterns are coincident, is used as the value of the autofocus signal for inspection.

4. The method according to claim 1 further comprising:

determining whether a difference between a height position being a focus position of the inspection optical system and the height position of the pattern forming surface of the evaluation substrate corresponding to the value of the autofocus signal for inspection is larger than a second threshold; and adjusting, in a case where the difference is larger than the second threshold, the inspection optical system such that the focus position of the inspection optical system becomes the height position of the pattern forming surface of the evaluation substrate corresponding to the value of the autofocus signal for inspection.

5. The method according to claim 1, wherein a value in a region surrounded by a plurality of values of autofocus signals of a plurality of height positions each calculated for each combination of two types of figure patterns and each being a value at a same height position of the evaluation substrate, where values of autofocus signals of a combination of two types of figure patterns are coincident, is used as the value of the autofocus signal for inspection.

6. The method according to claim 1, wherein a value of an autofocus signal at a height position where a deviation between differences each between values of autofocus signals, each of the differences being calculated for each combination of two types of figure patterns, is smaller than others is used as the value of the autofocus signal for inspection.

7. A pattern inspection apparatus comprising:

a stage configured to mount thereon an evaluation substrate on which a plurality of types of figure patterns have been formed;

a drive mechanism configured to move a height position of the stage;

an autofocus optical system configured to lead, while varying a height position of a pattern forming surface of the evaluation substrate by moving the height position of the stage, one of a light transmitted through the evaluation substrate and a light reflected from the evaluation substrate irradiated with an inspection light to a first light amount sensor and a second light amount sensor which measure, for each of the plurality of types of figure patterns, a light amount at a front focus position and a light amount at a back focus position of the one of the light transmitted through the evaluation substrate and the light reflected from the evaluation substrate;

an autofocus signal calculation circuit configured to calculate an autofocus signal, for the each of the plurality of types of figure patterns and for each the height position of the pattern forming surface of the evaluation substrate, by using the light amount measured at the front focus position and the light amount measured at the back focus position;

a specification circuit configured to specify a value of an autofocus signal for inspection such that a difference between values of autofocus signals of the plurality of types of figure patterns calculated at a same height position of the pattern forming surface of the evaluation substrate is one of equal to and less than a threshold value;

an autofocus mechanism configured to adjust, in a state where an inspection substrate on which at least two types of figure patterns out of the plurality of types of figure patterns are formed is placed on the stage, a height position of a pattern forming surface of the inspection substrate, which may be changed with a horizontal direction movement of the stage, to a height position of the pattern forming surface corresponding to the value of the autofocus signal for inspection;

a sensor configured to acquire, in a state where the height position of the pattern forming surface of the inspection substrate has been adjusted to the height position of the pattern forming surface corresponding to the value of the autofocus signal for inspection, an optical image of the inspection substrate by receiving one of a light transmitted through the inspection substrate and a light reflected from the inspection substrate irradiated with an inspection light; and an inspection optical system configured to lead the one of the light transmitted through the inspection substrate and the light reflected from the inspection substrate to the sensor.

8. A method for adjusting a focus position of an inspection apparatus, comprising:

measuring, while varying a height position of a pattern forming surface of a substrate on which a plurality of types of figure patterns are formed, for each of the plurality of types of figure patterns, a light amount at a front focus position and a light amount at a back focus position of one of a light transmitted through the substrate and a light reflected from the substrate irradiated with an inspection light;

calculating an autofocus signal, for the each of the plurality of types of figure patterns and for each the height position of the pattern forming surface of the substrate, by using the light amount measured at the front focus position and the light amount measured at the back focus position;

specifying a value of an autofocus signal for inspection such that a difference between values of autofocus signals of the plurality of types of figure patterns calculated at a same height position of the pattern forming surface of the substrate is one of equal to and less than a threshold value; and acquiring, in a state where the substrate is placed on a stage, while adjusting the height position of the pattern forming surface of the substrate, which may be changed with a horizontal direction movement of the stage, to a height position of the pattern forming surface corresponding to the value of the autofocus signal for inspection, an optical image of the substrate by receiving by a sensor, through an inspection optical system, the one of the light transmitted through the substrate and the light reflected from the substrate irradiated with an inspection light.

9. The method according to claim 8, wherein a value of an autofocus signal at a same height position of the pattern forming surface of the substrate, where values of autofocus signals of the plurality of types of figure patterns calculated are coincident, is used as the value of the autofocus signal for inspection.

10. The method according to claim 8, wherein at least three types of figure patterns are used as the plurality of types of figure patterns, and a value between a maximum value and a minimum value in a plurality of values of autofocus signals each calculated for each combination of two types of figure patterns and each being a value at a same height position of the pattern forming surface of the substrate, where values of autofocus signals of a combination of two types of figure patterns are coincident, is used as the value of the autofocus signal for inspection.

* * * * *